United States Patent [19]

Mounce

[11] Patent Number: 5,452,216
[45] Date of Patent: Sep. 19, 1995

[54] MICROPROCESSOR-BASED NAVIGATIONAL AID SYSTEM WITH EXTERNAL ELECTRONIC CORRECTION

[76] Inventor: George R. Mounce, R R 2 Hants County, Newport, Nova Scotia Bon 2A0, Canada

[21] Appl. No.: 100,410

[22] Filed: Aug. 2, 1993

[51] Int. Cl.⁶ .......................................... G06F 165/00
[52] U.S. Cl. .................................. 364/449; 364/450; 342/357; 73/180
[58] Field of Search ............... 364/443, 444, 449, 450; 342/357, 451; 73/178 R, 170.02, 170.03, 180

[56] References Cited

U.S. PATENT DOCUMENTS

| | | | |
|---|---|---|---|
| 4,335,433 | 6/1982 | Bauer et al. | 364/443 |
| 4,340,936 | 7/1982 | Mounce | 364/443 |
| 4,445,118 | 4/1984 | Taylor et al. | 343/357 |
| 4,599,620 | 7/1986 | Evans | 343/357 |
| 4,652,884 | 3/1987 | Starker | 342/357 |
| 4,785,404 | 11/1988 | Sims et al. | 364/443 |
| 4,872,051 | 10/1989 | Naidenov et al. | 364/463 |
| 4,881,080 | 11/1989 | Jablonski | 342/357 |
| 4,894,662 | 1/1990 | Counselman | 342/357 |
| 4,899,285 | 2/1990 | Nakayama et al. | 364/449 |
| 4,903,212 | 2/1990 | Yokouchi et al. | 364/449 |
| 4,939,661 | 7/1990 | Barker et al. | 364/521 |
| 4,990,922 | 2/1991 | Young et al. | 342/52 |
| 5,307,277 | 4/1994 | Hirano | 364/449 |

FOREIGN PATENT DOCUMENTS

| | | |
|---|---|---|
| 57-91405 | 6/1982 | Japan . |
| 59-56107 | 3/1984 | Japan . |
| 59-56108 | 3/1984 | Japan . |
| 61-159107 | 7/1986 | Japan . |
| 61-247916 | 11/1986 | Japan . |

Primary Examiner—Michael Zanelli
Attorney, Agent, or Firm—Dowell & Dowell

[57] ABSTRACT

An improved microprocessor-based navigational aid system for use onboard a vessel is disclosed. The system includes a microprocessor having peripheral memory devices, sensors for measuring variable parameters and thumb switches for inserting known values for fixed parameters. The microprocessor computes from these parameters, data which enable the optimum navigation of a vessel. In determining these data, the computation includes such factors as leeway and current set and drift, which are determined electronically. The system includes components for receiving information regarding the vessel's present position from a satellite-based external information source. That information is relayed to the microprocessor which uses it to periodically correct the positional information stored in the peripheral memory device. The system further includes a sensor for measuring the heel angle of the vessel, a first display providing alpha and numeric readouts of the direction of movement of the vessel with respect to the earth, and a second display simultaneously providing alpha and numeric readouts of a selectable quantity.

20 Claims, 4 Drawing Sheets

MICROPROCESSOR-BASED NAVIGATIONAL AID SYSTEM WITH EXTERNAL ELECTRONIC CORRECTION

BACKGROUND OF THE INVENTION

1. Field of the Invention

This invention relates to a navigational aid system and, more particularly, to a navigational aid system for a vessel which periodically corrects positional information stored in an addressable peripheral memory device of a microprocessor with satellite provided electronic positional information at predetermined intervals of distance traveled by the vessel such that current set and drift can be electronically determined onboard.

2. Discussion of the Related Art

U.S. Pat. No. 4,340,936 to Mounce discloses a navigational aid system for the navigation of a vessel. The Mounce system receives information from a number of sensors, and then processes the information by a microprocessor in order to operate a display that indicates various quantities germane to the operation of the vessel. The specific information inputs from the sensors are wind direction, wind speed, heading (as determined by a compass), hull speed (the velocity of the vessel through the water), and leeway angle (the angle between the direction of motion and the center line of the vessel).

The Mounce system also requires the manual input of certain data into the random access memory (RAM) of a microprocessor, and particularly the current set and drift in the portion of the body of water in which the vessel is to navigate, and the course and distance to a destination. The microprocessor uses the inputs to provide running information to aid in the operation of the vessel. It has been found that accurate information pertaining to current set and drift is difficult to obtain, however, because it changes with time and the location of the vessel. Fortunately, electronic systems are now available that provide highly accurate electronic positional information. A microprocessor aboard a vessel that utilizes such electronic information would eliminate the need for inserting the current set and drift manually. Thus, there exists a need for a self-sufficient navigational aid system that may be placed aboard a vessel and is capable of receiving and using external electronic positional information to determine current set and drift, thereby eliminating any need to manually input the same information. Such a resulting self-sufficient navigational aid system would constitute an improvement over the Mounce system.

Any navigational system which determines vessel position by a summation of continuously taken data is subject to accumulated errors. Consequently, the accuracy of the position of the vessel determined by such a navigational system deteriorates with time and distance from its starting position. The recently developed electronic systems provide absolute position to a high degree of accuracy and enable the periodic correction of the generally inaccurate position determined by the summation process.

To satisfactorily accomplish the determination of current set and drift and position correction, the electronic positional information system must provide: (1) position information of the highest possible accuracy; (2) a means for transferring that position information to the RAM of a microprocessor aboard a vessel; and (3) a rate of response that is compatible with the rate at which information is available so that a display aboard a vessel can adequately indicate the rate of change of the physical quantities.

The first electronic position information system that offered worldwide coverage is known today as Omega. Omega uses a number of very low frequency transmitters, located at various positions on the globe, that emit transmissions capable of being received practically anywhere on earth. The Omega system uses very precise timing to determine the difference in distance between two or more transmitters and the point of reception, and uses that distance to determine a fix. However, the Omega system as presently available is cumbersome and of insufficient accuracy to be used as a source of positional information for the purposes of this invention.

A second system known as LORAN is also presently in wide use. LORAN operates in a manner similar to Omega, but on a vastly smaller scale. Particularly, radio transmitters are precisely located, usually along a coast line, and their transmissions are accurately synchronized such that by measuring the phase difference of the signals from two or more transmitters, a position fix can be determined. Present LORAN receivers, under ideal conditions, are capable of providing the type of information required by the microprocessor navigation system of this invention. However, the accuracy of position fixing is highly variable and depends on the arrangement of the transmitters and their distances from the point of reception. Furthermore, LORAN is not available worldwide. Accordingly, the LORAN system is also inadequate for the purposes of this invention.

There are presently three known systems utilizing satellites that provide electronic positional information. The first system is known as Satnav and is already becoming obsolete. The Satnav system will eventually be replaced by another system known as the Global Positioning System (GPS) which will provide worldwide coverage when a full complement of satellites is finally in orbit. A somewhat similar system is being implemented by Russia. The GPS is the preferred system for use in this invention. Even though the full complement of satellites is not yet operational, worldwide coverage is available, although for less than 24 hours per day. Furthermore, GPS receivers are available at a moderate cost and provide information readily utilized by a microprocessor-based navigation system.

GPS receivers are available that provide combined numeric and alpha readouts of some of the quantities provided by the microprocessor-based system of this invention. But, the only actual measurement performed by the GPS receiver results in the determination of present position, which must be compared to a past position in order to calculate quantities such as speed and heading which can be read out. In other words, the determination of any information other than present position by the GPS is obtained indirectly by calculation using additional positional data, in contrast to the known microprocessor-based system which receives that same information directly from onboard sensors.

The proper navigation of a vessel, and especially a sailing vessel, requires a knowledge of: (1) the actual speed and direction in which the vessel is moving relative to the bottom; (2) the direction the vessel should move in to sail directly to a destination; and (3) the wind direction and speed.

The actual speed and direction in which the vessel is moving relative to the bottom in turn depend on the following variables: (a) the compass heading or direction assumed by the center line of the vessel relative to the earth, (b) the speed of the vessel through the water in the center-line direction; (c) the leeway or velocity of the vessel relative to a direction perpendicular to the center line; and (d) the current set and drift, which is the direction and speed of the movement of the water in the area surrounding the vessel. The microprocessor-based system of this invention considers all of the variables (a)-(d) in calculating the actual speed and direction of the vessel relative to the bottom. In addition, the system of this invention provides a readout of the variables (a)-(d) which greatly aids the operation of the vessel in certain situations. For example, a knowledge of leeway can assist in proper sail adjustment, and a readout of the speed of the vessel through the water aids in sail trimming. Although a readout of these variables by a GPS receiver is possible, the accuracy and rate of response are so linked together that an adequate accuracy is not obtainable along with an acceptable rate of response.

With respect to accuracy, the GPS has sufficient accuracy for the determination of current set and drift, but insufficient accuracy for the determination of vessel speed and leeway. The GPS determines only position, and vessel speed must be calculated by taking the difference between two position readings which gives the distance the vessel has moved, and dividing that difference by the time between the position readings. The problem is that if a readout of speed is to be used for sail adjustment, the readout must be consistent and have a reasonable rate of response. The GPS cannot simultaneously meet these requirements satisfactorily.

For example, if a vessel is moving at a speed of five knots in the true north direction, and the time between readouts is two seconds, which is common for a microprocessor-based system, the vessel moves 3.38 feet in those two seconds, which corresponds to a change in position of 0.00056 minutes of latitude. But, if an inconsistency of ±20 feet is assumed for the GPS reading, a meaningful vessel speed cannot be obtained therefrom at a response rate of two seconds. In fact, assuming a consistency of 0.1 knots is required, the time between position readings used in the speed calculation would have to be approximately 23.7 sec. That rate of response is far too slow for the purposes of sail trimming and determining the best angle relative to the wind for optimum operation of the sailboat.

Another consideration is that speed measurement accuracy or consistency is speed dependent. For a sailboat, a speed of much less than 5 knots is often encountered. Accordingly, it is necessary to measure speed of the vessel directly using one of the means already available for that purpose.

The meaning of the term "consistency" as used herein will now be explained. In a digital readout, if the quantity displayed varies, not because the quantity being measured actually varies but because of the errors in the measurement of that quantity, the digital display will vary around the actual value. For example, even if the vessel is proceeding at a constant speed of 5.0, errors in the measurement of speed by position difference as determined by a satellite system may give a series of readings at two second intervals such as 5.0, 4.9, 5.2, 4.8, 5.0, etc. Such scattered measurements are not very useful to those attempting to trim the sails in order to achieve maximum speed of the sailboat.

The measurement of leeway is subject to the same problems as is the measurement of speed, and even at a greater extent because the rate of movement in the cross-track direction is normally much less than the speed in the direction parallel to the center line of the craft. Because leeway must be known to determine the speed and direction of the vessel relative to the bottom, which in turn must be known for the proper steering of the vessel, leeway must also be measured directly and not by the GPS.

The determination of current set and drift is different than for vessel speed and leeway because the two former variables change relatively slowly except in exceptional circumstances. Thus, an appropriate amount of vessel movement can be allowed between the two position readings used to establish set and drift to provide the required level of accuracy. An accuracy of ±20 feet is useless for the measurement of speed, as well as for current set and drift, if the vessel moves only 10 feet between readings. But if the vessel were to move 1000 feet between readings, these factors could be determined with an accuracy of about 2%, which represents a substantial improvement over any other presently available system.

The Mounce microprocessor-based system determines vessel position by an integration of the data measured by its sensors. Because these individual data have a measurement accuracy factor, while the percentage accuracy in the determination of distance and direction from a starting point remains relatively constant, the absolute positional accuracy gradually deteriorates. A position determining system such as GPS provides a relatively constant and high accuracy position determination. Using the position determined by the GPS or a like system, the position determined by the Mounce microprocessor-based system could be updated such that its accuracy becomes substantially equivalent to that of the GPS, while it still maintains the rate of response necessary for the moment to moment control of the vessel. Thus, the integration of the two systems would result in an improved system having the best features of each.

With respect to the sailing direction to reach the destination, both the GPS and the Mounce microprocessor-based system are capable of determining it with approximately equal accuracy, but it is more convenient to have this direction displayed on the readout associated with the microprocessor aboard the vessel.

With respect to the measurement and display of wind direction and speed, the GPS is unable to determine either value. Consequently, these values must be determined onboard by wind speed and direction sensors, and the microprocessor-based system can display them relative to the vessel and also calculate and display the direction and speed of the wind relative to the earth and to the vessel. A number of systems are available for measurement and display of wind speed and direction relative to the vessel because that information is supplied directly by sensors. The determination of the actual wind direction and speed relative to the earth requires a vector resolution using the values calculated for the speed and direction of the vessel. These values can only be provided by a microprocessor-based system.

There has also been a need in the art for a navigational aid system that includes a sensor for measuring the angle of heel of the vessel. A heel angle sensor would provide a readout of the angle by which the aspect of the vessel in a direction at right angles to the center line deviates from the aspect when the vessel is at rest and not acted upon by wind or current. The heel angle can be important during the operation of a vessel, not only as an indicator of when the vessel is approaching an unsafe degree of heel or tilt, but also as an aid to maximizing vessel speed. This is because a given vessel has a specific range of values for heel in a given set of sailing conditions over which the greatest speed through the water can be attained.

In addition to making it possible to display the heel angle, such a sensor would improve the accuracy of the value of leeway as determined by the microprocessor. The known method of measuring the leeway angle is by a vane mounted on the underside of the vessel and attached to an electromechanical assembly which produces a signal proportional to the angle of the vane relative to the center line of the vessel. For a given set of conditions, the leeway angle thus measured is reduced as the vessel heels.

The Mounce system includes a display consisting of a first alpha display for designating a quantity that is indicated by a second display adjacent to the alpha display. The Mounce system is inadequate, however, because a continuous readout of the actual boat direction with respect to the earth is impossible if other parameters are displayed. This quantity should be available to the helmsman at all times so that the vessel can be steered in the desired course. Thus, there has been a need for a display that provides this information.

There has also been a need for a pair of onboard displays; one providing an alpha and numeric readout of the actual boat direction with respect to the earth, and the other providing the same two types of readouts for a manually selectable quantity.

SUMMARY OF THE INVENTION

This invention has been made in view of the above-described inadequacies of the prior art and has as an object to provide a self-sufficient navigational aid system for use aboard a vessel.

It is another object of this invention to provide a microprocessor-based navigational aid system which is compatible with an external source of highly accurate positional information which is utilized for onboard positional correction of the vessel.

It is still another object of this invention to provide a microprocessor-based navigational aid system which uses external provided positional information to electronically determine current set and drift in the vicinity of the vessel.

It is a further object of this invention to provide a microprocessor-based navigational aid system including a microprocessor having a computer program which is capable of using external provided positional information to electronically determine the current set and drift.

It is a still further object of this invention to provide a microprocessor-based navigational aid system including a heel angle sensor for measuring the heel angle of the vessel.

It is a yet still further object of this invention to provide a microprocessor-based navigational aid system including dual displays; one display continuously providing alpha and numeric readouts of a fixed quantity, and the other display providing the same two types of readouts for a selectable quantity.

To achieve the objects of this invention, as embodied and broadly described herein, the microprocessor-based navigational aid system of this invention comprises means for measuring variable navigational parameters defining the movement of the vessel relative to the body of water in which it is traveling, and the movement of the wind relative to the vessel. The navigational aid system further includes means for manually inputting fixed navigational parameters, and means for supplying electronic positional information accurately defining the vessel position with respect to the earth from an external source. The positional information is provided at predetermined intervals of distance traveled by the vessel to assure that its accuracy is acceptably high.

The variable and fixed navigational parameters and the electronic positional information are utilized by a microprocessor to compute the position of the vessel with respect to the earth, and the current set and current drift in the vicinity of the vessel.

DETAILED DESCRIPTION OF THE PREFERRED EMBODIMENTS

Reference will now be made in detail to the preferred embodiments of the invention, as illustrated in the accompanying drawings.

Figure 1:
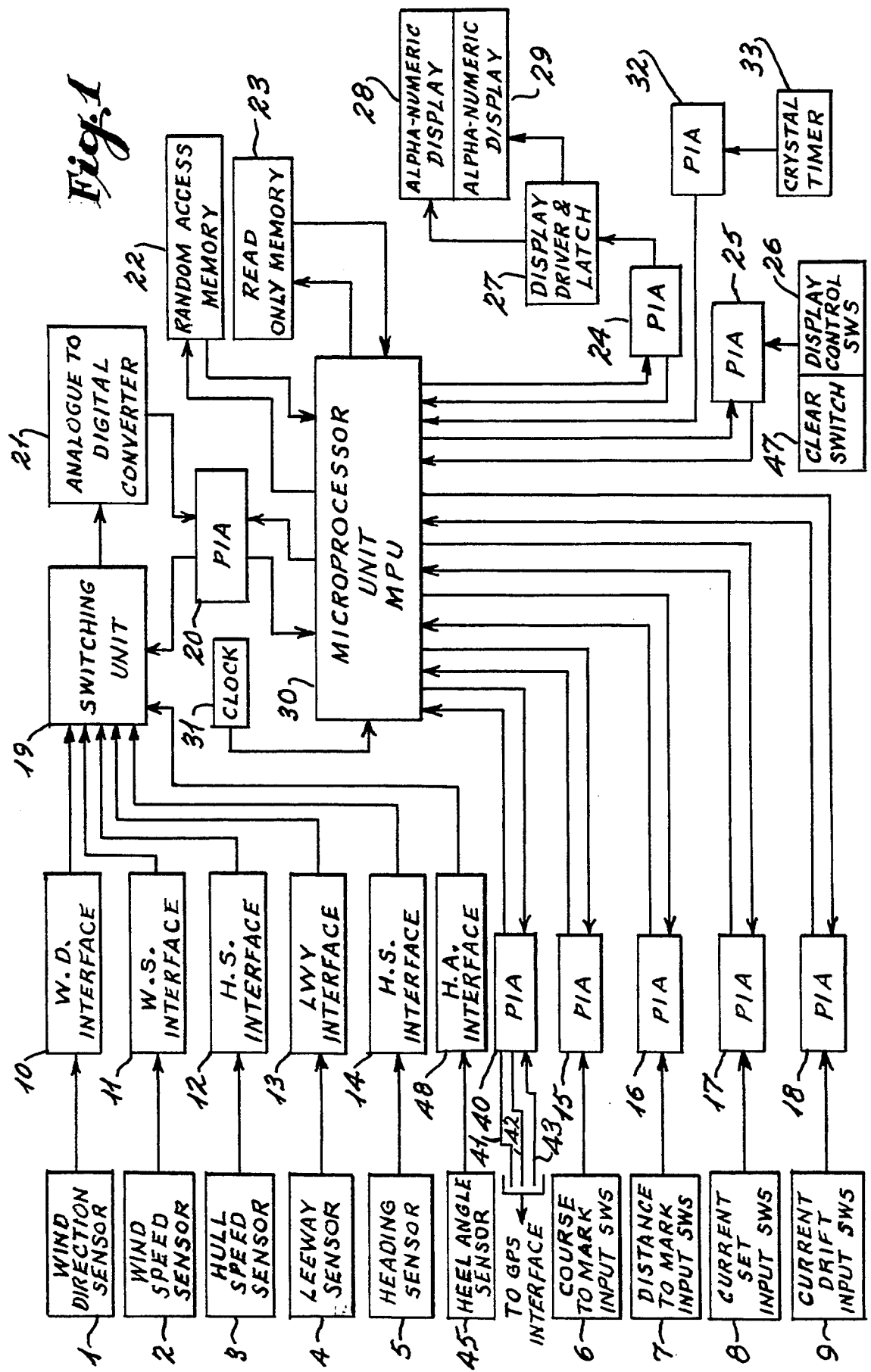
FIG. 1 is a block diagram showing part of the microprocessor-based navigation system in accordance with this invention.
Figure 3:
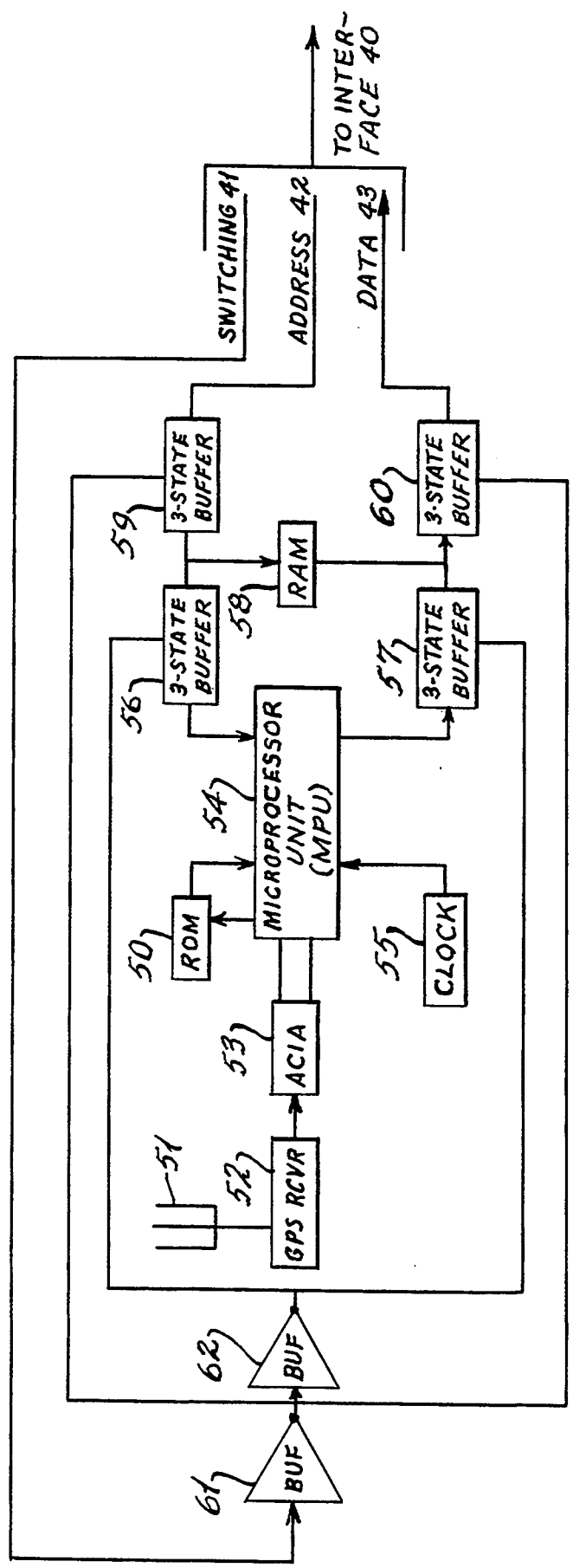
FIG. 3 is a block diagram of components of the navigational aid system for supplying positional information to the microprocessor-based system.

With reference to FIG. 1, items 1–27 and 30–31 illustrated therein are described in U.S. Pat. No. 4,340,936 to Mounce which is incorporated herein by reference. Additional items illustrated in FIGS. 1 and 3 are added to the Mounce system in this invention.

Peripheral interface adapter (PIA) 40 is an added interface that enables microprocessor unit (MPU) 30 to obtain information from the GPS. PIA 40 includes a switching bus 41 and an address bus 42 for procuring information from the GPS interface unit, and data bus 43 for returning information on demand.

In accordance with the invention, the navigational aid system comprises means for measuring variable navigational parameters defining the movement of the vessel relative to the body of water and the movement of the wind. The measuring means includes the sensors 1, 2, 3, 4, 5 as illustrated in FIG. 1, and a heel angle sensor 45 for measuring the heel angle of the vessel. Heel angle sensor 45 produces a signal proportional to the heel angle. This sensor may be a conventional sensor such as a damped mechanical system consisting of a weight or pendulum that actuates a device, such as a potentiometer or rotary differential transformer. The heel angle sensor not only provides a useful reading of the heel angle, it also importantly provides a means for correcting the response from the leeway sensor for heel angles other than zero. A zero heel angle correlates with no heeling of the vessel. The response of a vane for measuring the leeway angle is decreased by a factor related to the cosine of the heel angle. The corrected leeway which takes into account an increase in heel angle is equal to the value of the uncorrected leeway measurement divided by the cosine of the heel angle:

corrected leeway = uncorrected leeway/cos (heel angle)

The electrical output of the heel angle sensor 45 is connected to a heel angle (H.A.) interface 46 which conditions the signal to have the proper characteristics for application to an analogue to digital converter 21 through a switching unit 19. Switching unit 19, as described in Mounce, operates under the control of MPU 30 to connect in turn each of the interfaces 10, 11, 12, 13, 14 and 46, to the analogue to digital converter 21. The resulting digital values for all of the quantities are stored in a first storing means for use by MPU 30 for calculation or display purposes as directed by the program located in read only memory (ROM) 23. As embodied herein, the first storing means includes a RAM 22. Mounce describes the operation of a display under the control of a display control SWS 26.

This invention further includes a first alpha-numeric display 28 to provide a readout of the actual boat direction with respect to the earth (ABD). The ABD is of constant interest to the helmsman, and hence should be available and visible at all times in order to assist steering the vessel along the desired course. The ABD reading is equivalent to a compass indication in a vessel not equipped with computation means for giving the actual direction of movement of the vessel with respect to the earth. The ABD readout is derived from the vector quantities of compass heading, leeway, and current set and current drift. The alpha-numeric display 28 indicates the fixed alpha designation "ABD" followed by a preferably in-line numeric readout in degrees of the direction of movement of the vessel with respect to the earth. This reading may be with respect to true north or with respect to magnetic north as predetermined by the program controlling the operation of MPU 30. The program in ROM 23 directs MPU 30 to put the calculated ABD value into a proper location of the alpha-numeric display 28. This fixed readout of alpha-numeric display 28 substantially aids in steering of the vessel.

This invention also includes a second alpha-numeric display 29 that provides an alpha designation followed by a numeric readout of a different parameter than for the first display 28. Any of the following switch selectable parameters may be chosen for display by the second display 29:

| ALPHA DESIGNATION | NUMERIC READOUT |
|---|---|
| AWD | Actual wind direction |
| RWD | Relative wind direction — the apparent wind direction relative to the vessel |
| AWS | Actual wind speed |
| RWS | Relative wind speed — the apparent wind speed relative to the vessel |
| CH | Compass heading — the direction in which the vessel is pointed, either with respect to true north or magnetic north |
| HA | Heel angle |
| ULA | Uncorrected leeway angle — the actual reading of the leeway sensor uncorrected by the HA |
| LWA | Leeway angle — the ULA as corrected by the HA |
| CUS | Current set — the direction of movement of the current as either from a manual input or computed from satellite provided information |
| CUD | Current drift — the velocity of the current in the CUS direction either from a manual input or computed from satellite provided information |
| WBS | Water boat speed — the speed of the boat relative to the water |
| ABS | Actual boat speed — the WBS corrected for LWA, CUS and CUD, i.e., the vessel speed relative to the bottom in the direction in which the vessel is moving |
| SAT | Satellite — indicates whether or not the satellite system is producing authentic information |
| CTM | Course to mark — the course to be sailed to reach a destination specified by a manual input |
| DTM | Distance to mark — the distance to a destination specified by a manual input |
| STM | Speed to mark — the component of the vessel's speed (in the direction it is moving) toward a destination specified by a manual input. If the vessel is moving away from the mark, the indication is negative. |

Alpha-numeric display 29 operates by display control SWS 26 acting through PIA 25 to permit MPU 30 to place in RAM 22 a pattern of digital information controlling which readouts appear sequentially on the display.

In summary, this invention includes a first alpha-numeric display 28 providing of an alpha designation adjacent to and, preferably, in line with, a numeric readout indicating the direction of movement of the vessel with respect to the earth. The first display 28 is constantly positioned adjacent to the second numeric display 29. The second display provides a second alpha readout, preferably in line with a second numeric display, with the second display 29 being capable by way of program switches, of calling up various selectable readouts as desired by an operator. The list of possible alpha designations and numeric readouts described above is not exhaustive, and other parameters and readouts may also be used depending on the specific application of the system. Both the first display 28 and the second display 29 may be conventional displays such as liquid crystal type displays and the like.

In accordance with this invention, the navigational aid system includes means for supplying to MPU 30 electronic information from an external source defining the vessel position with respect to the earth. The supplying means illustrated in FIG. 3 includes MPU 54 that operates under the control of a program supplied by ROM 50. It is one function of this program to condition asynchronous communications interface adapter (ACIA) 53 to receive serial data from GPS receiver 52. ACIA 53 converts the serial data to a parallel format for subsequent processing by MPU 54.

Antenna 51 cooperates with a GPS receiver 52 to pick up signals from satellites associated with the GPS system which continuously orbit the earth. These signals are processed by GPS receiver 52 in order to obtain latitude and longitude information defining the position of the receiving antenna 51. GPS receiver 52 may be any suitable commercially available GPS receiver, such as the Raytheon RAYSTAR 920. In addition to the requirement that the system be able to receive the positional information provided by the satellite system, the GPS receiver 52 must have a serial output of latitude and longitude significant to 0.001 minutes. It must also have means in the form of an output, and preferably as part of the serial output information, which indicates whether or not latitude and longitude are presently being determined from actual satellite signals, i.e., that the information is in fact a satellite-derived position. The serial output must have an identification such that the MPU 54 can determine the proper address where the data should be stored in RAM 58. The identification may be in the form of a code preceding each block of information, by particular position in a string of information, or both.

The output from GPS receiver 52 applied to ACIA 53 is of a conventional form such as NEMA 0180 or JRC. For such various forms of information transferral, the alpha or numeric type information is contained in the relationship and the absence or presence of individual pulses in a series of pulses.

Figure 4:
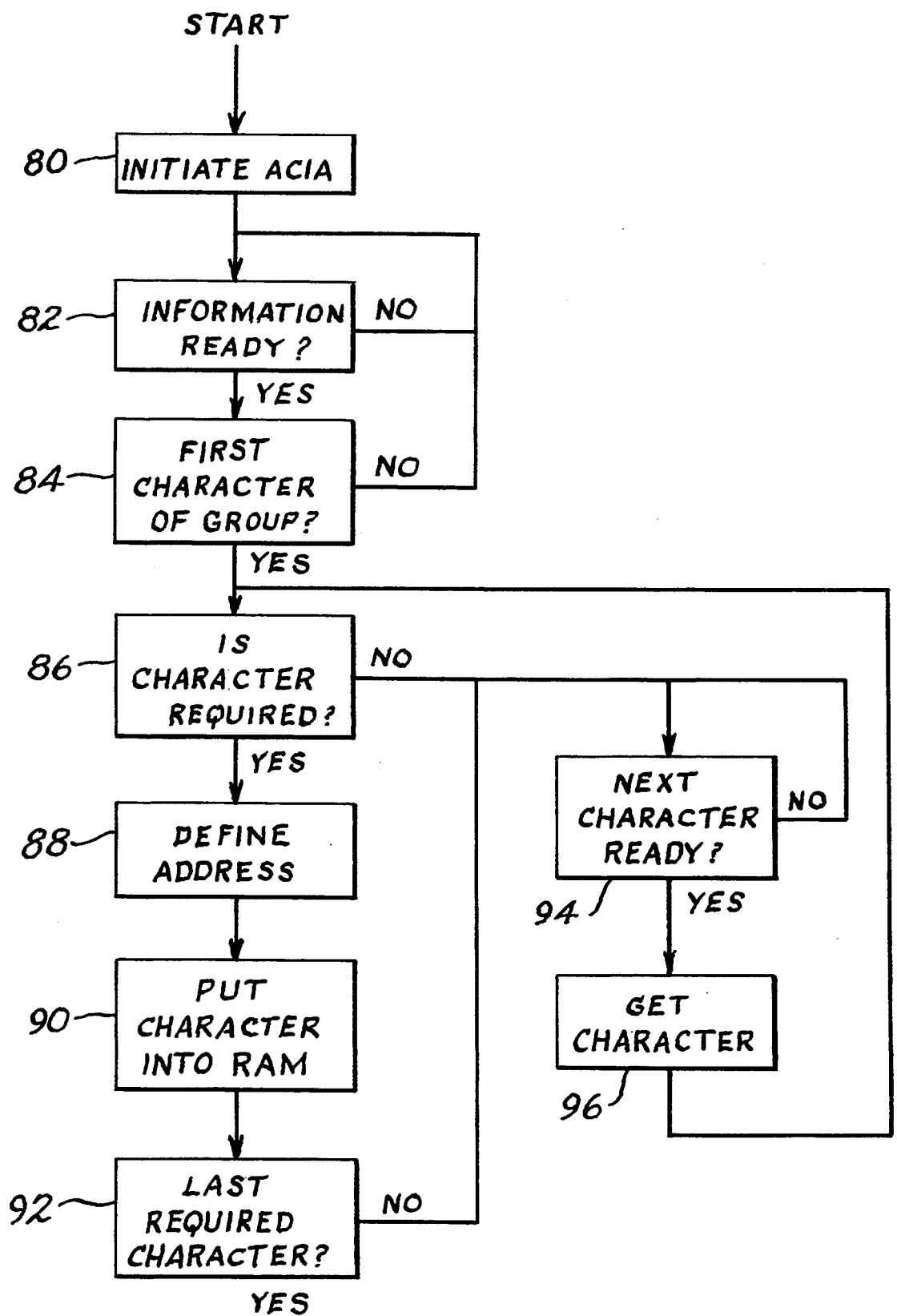
FIG. 4 is a flow diagram of the interface illustrated in FIG. 3.

FIG. 4 is a flow diagram of the function of ACIA 53 of FIG. 3. ACIA 53, after being properly initiated at start-up by MPU 54 according to the step INITIATE ACIA 80, receives the serial data from GPS receiver 52, and each time a number or letter is received, a dedicated output indicates by a "yes" response to the INFORMATION READY? 82 step that the information is available in a parallel format for transfer to RAM 58 by the action of MPU 54 as indicated by the steps 86, 88 and 90. As soon as the information representing one digit or letter is read out, ACIA 53 is cleared so that it may receive the next character as indicated by the steps 94 and 96. The serial information from GPS receiver 52 is in blocks or groups of information, and each block represents up-dated data. A block of information may optionally contain much more information than latitude, longitude and a status bite. MPU 54 checks the information as it is received from ACIA 53, determines if it should be further processed, and, if so, the address where it should be stored in RAM 58.

In order for the GPS interface to operate properly, the GPS information must be available to the microprocessor-based system whenever it is required by the main program associated with MPU 30. Because the GPS receiver cannot be synchronized with the main program that controls MPU 30, a second means for storing information is necessary. As embodied herein, the second storing means preferably includes RAM 58, as shown in FIG. 3. To store the information, MPU 54 applies an address through 3-state buffer 56 to the address inputs of RAM 58 and simultaneously provides data to the data inputs of RAM 58 through 3-state buffer 57. Each of the 3-state buffers 56, 57, 59 and 60 is actually a group of buffers to permit passage of individual address and data line information. As used herein, a "3-state buffer" is a buffer that includes a control input. When a suitable signal is applied to a control input, signal passage through the buffer is blocked, and the output is placed in a high-impedance mode. This action essentially removes the buffer from having an effect on the function of the circuits connected to its outputs.

Information transferral to MPU 30 is accomplished by three busses connected to PIA 40 in the microprocessor-based system. These busses are labelled switching 41, address 42 and data 43 in FIG. 1. When MPU 30 requires GPS information, the state of the switching bus 41 is changed to indicate that a readout is desired. An address is then put on the address bus 42, and the required information is received on the data bus 43. That information is then available at PIA 40 to be transferred to RAM 22 at a specific address. This process is continued until all the desired information, i.e., latitude, longitude and status, has been transferred, at which time the state of the switching bus is changed to indicate that a readout is not desired.

At the GPS interface-related end of the busses 41, 42 and 43, the switching bus 41 is connected to the input of inverting buffer 61. The output of inverting buffer 61 goes to the control inputs of 3-state buffer 59 and 3-state buffer 60. These 3-state buffers are inactive and their outputs are in the high-impedance mode when transfer of information to the microprocessor-based system is not required. The output of buffer 61 also goes to the input of inverting buffer 62, and the output of inverting buffer 62 goes to the control inputs of 3-state buffer 56 and 3-state buffer 57. Because the control signal is inverted, 3-state buffer 56 and 3-state buffer 57 are in the opposite mode with respect to 3-state buffer 59 and 3-state buffer 60. Therefore, as previously explained, RAM 58 receives and retains updated GPS information.

When information is requested by the microprocessor-based system, the switching bus signal changes state which causes 3-state buffer 59 and 3-state buffer 60 to turn on so as to allow RAM 58 to be interrogated and the GPS data to be transferred to RAM 22. At the same time, in order to avoid any interruption of data transfer, 3-state buffer 56 and 3-state buffer 57 are put into the high-impedance mode by a control signal from inverting buffer 62. In other words, RAM 58 functions as a repository for GPS information which is continually updated as long as the microprocessor-based system does not need the information. When the data is needed, RAM 58 is disconnected from the source of information and connected to the microprocessor-based system.

Figure 2:
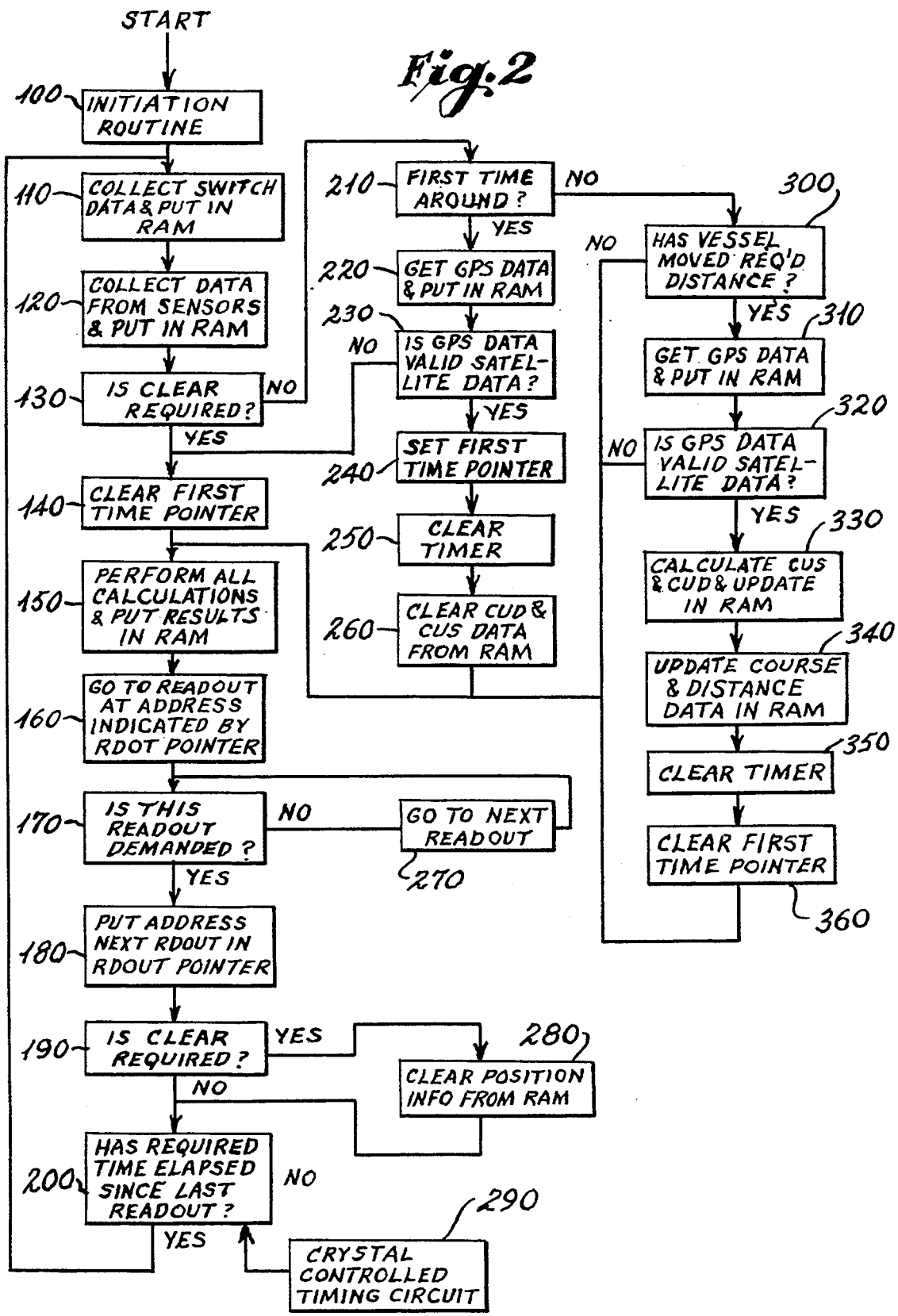
FIG. 2 is a flow diagram of a program associated with the microprocessor-based system of this invention.

As explained above, GPS positional data is made available to MPU 30 by PIA 40. FIG. 2 shows the program steps which utilize this information, as well as the information from the onboard sensors, to actuate a readout for displaying the information as an aid to navigating a vessel. When power is applied to the microprocessor-based system, it begins the program illustrated in FIG. 2 with the INITIATION routine 100. Referring to FIG. 1, the INITIATION routine 100 sets up PIA 15, 16, 17, 18, 20, 24, 25 and 40, and adjusts the RAM 22 to its initial state. In the initiation process, one particular action is to clear the first time pointer in RAM 22. This pointer will be checked later to determine the path taken by the program.

Next, the program polls the switching unit 19 and puts all the information defined by the switches in RAM 22. This information includes current set and drift, and course and distance to a destination. This information is to be displayed sequentially by alpha display 28 and numeric display 29, in addition to the condition of a clear switch 47 which is part of display control SWS 26.

The COLLECT DATA FROM SENSORS & PUT IN RAM routine 120 collects data from the onboard sensors which measure wind speed and direction, hull speed, compass heading, heel angle and leeway, and puts these data in designated locations in RAM 22 for later use.

The route taken by the program in the steps that follow is determined by clear switch 47, which is an important component with respect to the operation of the system. Before leaving a departure point, the clear switch must be in the "yes" condition so that RAM 22 is cleared of all previous position data and is ready to accept new information pertaining to the progressively changing position of the vessel as it moves from the departure point. On leaving the departure point, the switch must be operated manually to produce a "no"

signal to indicate that MPU 30 should be allowed to accumulate continuously updated position information in tiny increments at time intervals determined by the rate at which the program cycles. Therefore, the program must decide which path to take based on the answer to "IS CLEAR REQUIRED? 130." If "yes" is signified by the status of the clear switch when it is polled, the program continues on to clear the first time pointer. But if clearing is not required, the program branches to the FIRST TIME AROUND? test 210.

Assuming for the purposes of explanation that the answer to IS CLEAR REQUIRED? is "yes", the program continues to the CLEAR FIRST TIME POINTER routine 140 and then continues to the PERFORM ALL CALCULATIONS & PUT ANSWERS IN RAM routine 150. The results of these calculations in addition to any of the values derived from the sensors are then available to be displayed on the alpha/numeric displays 28 and 29 in accordance with the routine disclosed in Mounce.

Following the display routine, the program again checks IS CLEAR REQUIRED? 190. If the answer is "yes", the program goes through a routine to CLEAR POSITION INFORMATION FROM RAM 280 before returning to the main program. If the answer is "no", the program goes immediately into a holding routine while continuously checking HAS REQUIRED TIME ELAPSED SINCE LAST READOUT? 200. The elapsed time is checked against information from a crystal-controlled timing circuit 47 which is associated with PIA 32. This timing circuit sets the timing of one complete cycle of operation of the microprocessor and hence determines the period between updates of the display. At the end of the program cycle, the microprocessor continuously polls PIA 32 until it receives a signal from the timer indicating that the proper amount of time has elapsed since the beginning of the program cycle. With respect to the actual time between program cycles, this time must be of sufficient duration to permit the program to complete all operations and be ready for the next cycle before the end of the period. In practice, it has been found that a period of two seconds is preferable because it is adequate for program completion, and it allows sufficient time for observing the readout as it updates at that interval. The time interval may optionally be any period greater than the period of one program cycle.

When the answer to HAS REQUIRED TIME ELAPSED SINCE LAST READOUT? 200 becomes "yes", the program immediately proceeds to a point just after the INITIATION ROUTINE 110 and enters the COLLECT SWITCH DATA & PUT IN RAM routine 110. A new program cycle is started.

After the clear switch has been moved to the position not requiring that data be cleared from RAM 22, the first IS CLEAR REQUIRED? test 130 results in a "no" answer. The program then branches to check FIRST TIME AROUND? 210. Because the first time pointer was cleared during initiation, if the program encounters that routine for the first time, the answer will be "yes".

The "yes" branch requires the interrogation of the GPS interface 40 shown in FIG. 3 to obtain the information provided by GPS receiver 52 that is stored in RAM 58 as indicated by the GET GPS DATA & PUT IN RAM step 230. As previously explained, part of this information indicates if the position information is actually determined from satellite provided information. If, for any reason, the GPS receiver 52 is not supplying satellite provided positional information, as determined by the IS GPS DATA VALID SATELLITE DATA? step 230, that information is not used by MPU 30, and the program goes to CLEAR FIRST TIME POINTER 140 in the program process previously described. By clearing the first time pointer, the program ensures that it will continue getting a "yes" answer from the FIRST TIME AROUND? 210 routine until the answer from IS GPS DATA VALID SATELLITE DATA? 230 becomes "yes", indicating that the GPS receiver is receiving signals from satellites that are adequate to produce acceptable positional information.

Once the answer to IS GPS DATA VALID SATELLITE DATA? 230 is "yes", the program proceeds to SET FIRST TIME POINTER 240, and then to CLEAR TIMER 250. The program will subsequently obtain GPS positional data after the vessel has moved beyond a specified distance and, in order to calculate speed from distance, the time required to move the specific distance is needed. The CLEAR TIMER operation 250 sets a timer to zero which then measures time from that instant onward, so that elapsed time can be later determined to calculate vessel speed.

The next step in the program is CLEAR CUD & CUS DATA FROM RAM 260, which equates current drift and current set to zero for the first measurement distance. Following that procedure, the program goes to PERFORM ALL CALCULATIONS & PUT RESULTS IN RAM 150, continues to complete the program cycle, and then returns again to the beginning of the program.

The next cycle of the program again arrives at the FIRST TIME AROUND? 210 check, but this time, because the first time pointer was set during the previous cycle of the program, the answer is "no" and the program goes to the HAS VESSEL MOVED REQ'D DISTANCE? routine 300. The program keeps track of the distance moved by the vessel and keeps an updated record of that distance in RAM 22. The vessel must move a minimum distance between satellite position fixes in order to obtain the required accuracy for the current set and drift. The program checks to determine if that minimum distance has been traveled. If the answer is "no", the program returns to PERFORM ALL CALCULATIONS & PUT IN RAM 150 and continues its normal cycle. This process continues until the vessel has moved more than the minimum distance so that the answer to HAS VESSEL MOVED REQ'D DISTANCE? 300 is "yes", at which time the program proceeds to GET GPS DATA & PUT IN RAM 310. This data will be updated positional information.

To verify that the GPS data is still authentic, the program goes to IS GPS DATA VALID SATELLITE DATA? 320. If the answer is "no", the program returns to the PERFORM ALL CALCULATIONS & PUT IN RAM step 150 and continues the program cycle over the path previously described until the answer to IS GPS DATA VALID SATELLITE DATA? 320 is "yes", at which time the program proceeds to CALCULATE CUS & CUD & UPDATE IN RAM 330 to derive values for current set and drift and puts those values in RAM 22 for use in subsequent calculations of the actual direction of movement of the vessel and its speed in that direction. It should be noted that the values of current set and drift in RAM 22 are updated. If there was a value in memory for those parameters during the period since the previous position was put in memory, the calculations produce values representing the difference between the values in memory and those values determined by subsequent calculation. A vector addition is then performed to update values for current set and drift in RAM 22.

Following CALCULATE CUS & CUD & UPDATE RAM 330, the program moves to the UPDATE COURSE & DISTANCE DATA IN RAM 340 step to replace the current positional information, which has accumulated in RAM 22 by the addition of incremental distances by MPU 30, with the positional information derived from GPS receiver 52. The reason for performing this step has been explained above.

The next program step is to CLEAR TIMER 350 which begins the process of measuring the period until the next current set and drift calculation is to be made after the vessel has moved beyond the required distance. After the timer is reset, the program moves to CLEAR FIRST TIME POINTER 360 so that the program will follow the route during the next cycle dictated by a "yes" answer to the FIRST TIME AROUND? 210 routine. Following that action, the program returns to PERFORM ALL CALCULATIONS & PUT RESULTS IN RAM 150. The program continues to cycle, updating positional and current set and current drift data every time the vessel's movement exceeds the minimum value required to provide the desired accuracy.

It will be understood from following the program through its various operations, that in the absence of information that authentic information is provided from the GPS receiver, the program operates in the same manner as the program disclosed in Mounce. In other words, the present system is capable of operating in a known manner, in the absence of authentic positional information from a GPS receiver, or in the absence of the GPS altogether.

The foregoing description of the preferred embodiment of the invention has been presented to illustrate the principles of the invention and not to limit the invention to the particular embodiment illustrated. It is intended that the scope of the invention be defined by all of the embodiments encompassed within the following claims, and their equivalents.

What is claimed is:

1. A navigational aid system for use in navigating a vessel to a destination, comprising:
   (a) means for measuring variable navigational parameters defining the movement of the vessel relative to the water, and the movement of the wind relative to the vessel, including:
      (i) heading sensor means for measuring the heading of the vessel relative to the earth;
      (ii) heel angle sensor means for measuring the heel angle of the vessel relative to the vertical;
      (iii) hull speed sensor means for measuring the rate of movement of the vessel relative to the water; and
      (iv) leeway sensor means for measuring the leeway angle between the direction of movement of the vessel relative to the water and the heading;
   (b) means for inputting fixed navigational parameters;
   (c) a first random access memory for temporarily storing the variable and fixed navigational parameters;
   (d) a first read only memory containing a first program;
   (e) a first microprocessor for executing said first program, said first program utilizing said variable navigational parameters and said fixed navigational parameters to compute the position of the vessel by dead reckoning;
   (f) a timer means for repetitively initiating the execution of said first program after the lapse of a repetition period;
   (g) a starter means for determining a starting location of the vessel, said starter means being manually operable to enable said first program to initially erase any previously stored positional information from said first random access memory means and then to obtain once for each said repetition period said variable navigational parameters from said heading sensor means, said heel angle sensor means, said hull speed sensor means and said leeway sensor means, and to store the obtained said variable navigational parameters in said first random access memory means, and to enable said first program to correct the value of the leeway angle obtained from said leeway sensor means by utilizing the value of the heel angle obtained from said heel angle sensor means and to store the corrected value of the leeway angle in said first random access memory in place of the value obtained from said leeway sensor means;
   (h) means for supplying to said first microprocessor electronic information from a source external to the vessel defining the vessel position with respect to the earth, said electronic information being supplied each time the vessel travels a distance interval, at which times said first microprocessor computes the current set and current drift by comparing the position of the vessel computed by dead reckoning to the vessel position derived from said electronic information, said first program subsequently utilizing the values of the heading, corrected leeway angle and computed current set and drift to compute the actual direction of movement of the vessel with respect to the earth and then to correct the position of the vessel computed by dead reckoning so that it corresponds to the vessel position derived from said electronic information;
   (i) a first alpha-numeric display connected to said first microprocessor for providing a readout of the actual direction of movement of the vessel with respect to the earth, said readout being updated by said first microprocessor after the lapse of each said repetition period; and
   (j) a second alpha-numeric display connected to said first microprocessor for providing a readout of a selected navigational parameter.

2. The navigational aid system of claim 1, wherein said external source of information comprises the Global Positioning System (GPS).

3. The navigational aid system of claim 2, wherein said supplying means comprises an antenna and a receiver for receiving said electronic information from said GPS and providing an output of characters.

4. The navigational aid system of claim 3, wherein said supplying means comprises a second random access memory for storing said electronic information until it is transferred to said first microprocessor, the electronic information stored in said second random access memory being replaced by updated information at intervals of time as required by said supplying means.

5. The navigational aid system of claim 4, wherein said supplying means comprises a second microprocessor and a second read only memory containing a second program, said second microprocessor executes said second program to enable said characters to be decoded by said first microprocessor, transformed into a form useable by said first microprocessor, and stored in said second random access memory.

6. The navigational aid system of claim 5, wherein said supplying means comprises an interface for transferring information between said second random access memory and said first microprocessor.

7. The navigational aid system of claim 6, wherein said receiver comprises means for validating that said characters are being provided by said external source.

8. The navigational aid system of claim 7, further comprising means for manually inputting the current set and current drift into said first random access memory, said first microprocessor utilizes the manually input current set and current drift to compute the position of the vessel with respect to the earth in the absence of a validated output from said receiver.

9. The navigational aid system of claim 8, further comprising means to manually input into said first random access memory data defining the position of a destination of the vessel.

10. The navigational aid system of claim 1, wherein said external source of information comprises the LORAN system.

11. The navigational aid system of claim 1, wherein said means for measuring the movement of the wind relative to the vessel includes a wind direction sensor and a wind speed sensor.

12. A navigational aid system for use in navigating a vessel to a destination, comprising:
(a) means for measuring variable navigational parameters defining the movement of the vessel relative to the water, and the movement of the wind relative to the vessel, including:
 (i) heading sensor means for measuring the heading of the vessel relative to the earth;
 (ii) heel angle sensor means for measuring the heel angle of the vessel relative to the vertical;
 (iii) hull speed sensor means for measuring the rate of movement of the vessel relative to the water; and
 (iv) leeway sensor means for measuring the leeway angle between the direction of movement of the vessel relative to the water and the heading;
(b) means for inputting fixed navigational parameters;
(c) a first random access memory for temporarily storing the variable and fixed navigational parameters;
(d) a first read only memory containing a first program;
(e) a first microprocessor for executing said first program, said first program utilizing said variable navigational parameters and said fixed navigational parameters to compute the position of the vessel by dead reckoning;
(f) a timer means for repetitively initiating the execution of said first program after the lapse of a repetition period;
(g) a starter means for determining a starting location of the vessel, said starter means being manually operable to enable said first program to initially erase any previously stored positional information from said first random access memory means and then to obtain once for each said repetition period said variable navigational parameters from said heading sensor means, said heel angle sensor means, said hull speed sensor means and said leeway sensor means, and to store the obtained said variable navigational parameters in said first random access memory means, and to enable said first program to correct the value of the leeway angle obtained from said leeway sensor means by utilizing the value of the heel angle obtained from said heel angle sensor means and to store the corrected value of the leeway angle in said first random access memory in place of the value obtained from said leeway sensor means;
(h) means for supplying to said first microprocessor electronic information from a source external to the vessel defining the vessel position with respect to the earth, said electronic information being supplied each time the vessel travels a distance interval, at which times said first microprocessor computes the current set and current drift by comparing the position of the vessel computed by dead reckoning to the vessel position derived from said electronic information, said first program subsequently utilizing the values of the heading, corrected leeway angle and computed current set and drift to compute the actual direction of movement of the vessel with respect to the earth and then to correct the position of the vessel computed by dead reckoning so that it corresponds to the vessel position derived from said electronic information; and
(i) means for providing a readout of the actual direction of movement of the vessel with respect to the earth, said readout being updated by said first microprocessor after the lapse of each said repetition period.

13. The navigational aid system of claim 12, wherein said external source of information comprises the Global Positioning System (GPS).

14. The navigational aid system of claim 13, wherein said supplying means comprises a receiver for receiving said electronic information from said GPS and providing an output of characters.

15. The navigational aid system of claim 14, wherein said supplying means comprises a second random access memory for storing said electronic information until it is transferred to said first microprocessor, the electronic information stored in said second random access memory being replaced by updated information at intervals of time mandated by said supplying means.

16. The navigational aid system of claim 15, wherein said supplying means comprises a second microprocessor and a second read only memory containing a second program, said second microprocessor executes said second program to enable said characters to be decoded by said first microprocessor, transformed into a form useable by said first microprocessor, and stored in said second random access memory.

17. The navigational aid system of claim 16, wherein said supplying means comprises an interface for transferring information between said second random access memory and said first microprocessor.

18. The navigational aid system of claim 17, wherein said receiver comprises means for validating that said characters are being provided by said external source.

19. The navigational aid system of claim 18, further comprising means for manually inputting the current set and current drift into said first random access memory, said first microprocessor utilizes the manually input current set and current drift to compute the position of the vessel with respect to the earth in the absence of a validated output from said receiver.

20. The navigational aid system of claim 12, wherein said external source of information comprises the LORAN system.

* * * * *